US006480790B1

(12) United States Patent
Calvert et al.

(10) Patent No.: US 6,480,790 B1
(45) Date of Patent: Nov. 12, 2002

(54) PROCESS FOR CONSTRUCTING THREE-DIMENSIONAL GEOLOGIC MODELS HAVING ADJUSTABLE GEOLOGIC INTERFACES

(75) Inventors: Craig S. Calvert, Houston, TX (US); Thomas A. Jones, Bellaire, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 09/686,300

(22) Filed: Oct. 11, 2000

Related U.S. Application Data

(60) Provisional application No. 60/162,380, filed on Oct. 29, 1999.

(51) Int. Cl.[7] .................................................. G01V 1/28
(52) U.S. Cl. ........................................ 702/14; 702/16
(58) Field of Search ................................ 702/2, 5, 6, 7, 702/11, 13, 14, 16, 17, 18; 367/68, 69, 72, 73, 74

(56) References Cited

U.S. PATENT DOCUMENTS

| | | | | |
|---|---|---|---|---|
| 4,679,174 | A | 7/1987 | Gelfand | 367/73 |
| 5,838,634 | A | 11/1998 | Jones et al. | 367/73 |
| 5,844,564 | A | * 12/1998 | Bennis et al. | 345/423 |
| 5,870,690 | A | 2/1999 | Frenkel et al. | 702/7 |
| 5,905,657 | A | 5/1999 | Celniker | 364/578 |
| 6,070,125 | A | 5/2000 | Murphy et al. | 702/11 |
| 6,128,577 | A | 10/2000 | Assa et al. | 702/2 |
| 6,236,942 | B1 | * 5/2001 | Bush | 702/13 |

FOREIGN PATENT DOCUMENTS

| | | | |
|---|---|---|---|
| EP | 0 864 882 A2 | 9/1998 | G01V/1/28 |
| EP | 0 864 881 A3 | 12/2000 | G01V/1/28 |

OTHER PUBLICATIONS

Debeye, et al., "Stochastic Inversion", The Strategic Importance of Oil And Gas Technology Proceedings of the 5th European Union Hydrocarbon Symposium, Edinburgh, U.K., 1997, v. 1, p. 166–175.

Roggero and Hu, "Gradual Deformation of Continuous Geostatistical Models For History Matching", SPE–49004, Proceedings of the 1998 Annual SPE Technical Conference, p. 221–236.

Rahon, et al., "Identification Of Geological Shapes In Reservoir Engineering By History Matching Production Data", SPE–48969, Proceedings of the 1998 Annual SPE Technical Conference, p. 139–149.

Rahon, et al., "Inversion Of Geologic Shapes In Reservoir Engineering Using Well–Tests And History Matching Of Production Data", SPE–38656, Proceedings of the 1997 Annual SPE Technical Conference, p. 141–153.

Gelfand and Larner, "Seismic Lithologic Modeling", The Leading Edge, 1984, p. 30–35.

Duboz et al., "Moving To A Layered Impedance Cube: Advantages Of 3D Straigraphic Inversion", First Break, 1998, p. 311–318.

Gluck, et al., "Robust Multichannel Stratigraphic Inversion Of Stacked Data", Developments in Geophysical Techniques Relating To Finding THe Subtle Trap, Norwegian Petroluem Society, 1990.

* cited by examiner

Primary Examiner—Edward Lefkowitz
Assistant Examiner—Anthony Gutierrez
(74) Attorney, Agent, or Firm—Keith A. Bell (57) ABSTRACT

A process for constructing a three-dimensional geologic model of a subsurface earth volume in which the positions of geologic interfaces within the model are adjusted as the model is being constructed. The resulting geologic model should be consistent with all available geologic and geophysical information regarding the subsurface earth volume, including information regarding the spatial attributes of geologic interfaces within said subsurface earth volume.

22 Claims, 6 Drawing Sheets

PROCESS FOR CONSTRUCTING THREE-DIMENSIONAL GEOLOGIC MODELS HAVING ADJUSTABLE GEOLOGIC INTERFACES

This application claims the benefit of U.S. Provisional application no. 60/162,380 filed Oct. 29, 1999.

FIELD OF THE INVENTION

This invention relates generally to the field of geologic modeling. More particularly, the invention is a process for constructing a three-dimensional (3-D) geologic model of a subsurface earth volume in which the positions of geologic interfaces within the model are adjusted as the model is being constructed in order to improve the consistency between the model and available geologic and geophysical information regarding the subsurface earth volume.

BACKGROUND OF THE INVENTION

Geologic Modeling in General

In the oil and gas industry, geologic models are often used to aid in activities such as determining the locations of wells, estimating hydrocarbon reserves, or planning reservoir-development strategies. A geologic model is a computer-based representation of a subsurface earth volume, such as a petroleum reservoir or a depositional basin.

Geologic models may take on many different forms. Most commonly, descriptive or static geologic models built for petroleum applications are in the form of a 3-D array of model blocks (cells), or less commonly discrete model points, to which geologic and/or geophysical properties such as lithology, porosity, acoustic impedance, permeability, or water saturation are assigned (such properties will be referred to collectively herein as "rock properties"). The entire set of model blocks constitutes the geologic model and represents the subsurface earth volume of interest. Each model block represents a unique portion of the subsurface, so the model blocks should not overlap each other. Dimensions of the model blocks should be chosen so that the rock properties within a model block are relatively homogeneous, yet without creating an excessive number of model blocks. Most commonly, model blocks are square or rectangular in plan view and have thickness that is either constant or variable, but any shape may be used.

A geologic model is generally constrained by stratigraphic or structural surfaces (e.g., flooding surfaces, sequence interfaces, fluid contacts, faults) and boundaries (e.g., facies changes). These surfaces and boundaries define regions within the model that possibly have different rock properties. The term "geologic interface" will be used herein to refer to any interface between two subsurface regions having potentially different rock properties, including but not limited to structural and/or stratigraphic surfaces, facies boundaries, and the like.

In the geologic-modeling process, geologic interfaces are generally interpreted and positioned with the aid of well and seismic data, and are integrated into the geologic model as surface grids, polygons, or in other forms. Typically, these geologic interfaces are fixed within the geologic model; therefore, negligible uncertainty in their position is assumed. If this assumption is wrong, i.e., if the positions of geologic interfaces are inaccurate, the resulting geologic model may be a poor representation of the subsurface earth volume of interest. Moreover, the fact that the model is inaccurate may not be apparent to the persons who constructed it. Use of an inaccurate model could be very costly, potentially resulting, for example, in inaccurate estimates of hydrocarbon reserves, missed hydrocarbon-reservoir targets, and inappropriate reservoir-development strategies.

To minimize the risks associated with inaccurate positioning of geologic interfaces, an effort should be made to ensure that the positions of the geologic interfaces within the model are consistent with all available information and target assumptions for the subsurface volume being modeled. For example, the positions of geologic interfaces in the model should be consistent with all available seismic and well data, and with target assumptions such as frequency distributions for rock properties within regions defined by the geologic interfaces. Such efforts to ensure consistency are rarely pursued, however, as they can be expensive, time consuming, and subjective.

The goal of the geologic-modeling process is to assign rock properties to each model block in the geologic model so that the resulting model is an accurate representation of the subsurface earth volume of interest. This process can use many different data types, including but not limited to rock-property data obtained from wells, seismic data, structural and stratigraphic surfaces in the form of 2-D computer grids or meshes, and polygons or polylines that define distinct regions within the model. The latter two data types are described in more detail below.

The geologic-modeling process uses these data to assign values of the rock properties of interest to all model blocks within the geologic model. The assignment of a rock-property value is a process known to persons skilled in the art of geologic modeling. The value that is to be assigned to each model block is calculated using one of many known estimation methods, though the most commonly used methods are geostatistical.

Geostatistical estimation methods (which may be either deterministic or probabilistic) take into account distance, direction, and spatial continuity of the rock property being modeled. Deterministic estimation methods calculate a minimum-variance estimate of the rock property at each block. Probabilistic estimation methods develop distributions of the rock-property values and produce a suite of geologic models for the rock property being modeled, with each model theoretically being equally probable. The spatial continuity of a rock property may be captured by a variogram, a well-known technique for quantifying the variability of a rock property as a function of separation distance and direction.

Model-Based Seismic Inversion in Geologic Modeling

There are many procedures for constructing geologic models. The preferred geologic-modeling procedure for use with the present invention is referred to herein as "model-based seismic inversion." Model-based seismic inversion requires that numerous synthetic seismic traces be generated by perturbing model parameters (e.g., rock properties), until there is reasonable agreement between these synthetic seismic traces and actual seismic data traces for the subsurface volume being modeled. Obviously, the synthetic seismic traces should represent the type of actual seismic data being used (e.g., full stack, near-offset stack, far-offset stack, etc.).

Synthetic seismic modeling typically applies a convolutional modeling process. This process consists of using acoustic-impedance values (the product of acoustic velocity and density) to calculate reflection coefficients at the interfaces between layers in the model, and then constructing synthetic seismic traces by convolving the reflection coefficients with a specified seismic pulse. Model-based seismic inversion methods typically are constrained by various conditions that control the outcome. For example, the model may be constrained by measured acoustic-impedance data at wells and by stratigraphic surfaces interpreted in the seismic data. These constraints provide stabilization in the presence of seismic noise and reduce the number of possible solutions.

Some model-based seismic inversion approaches use geostatistical algorithms, such as sequential Gaussian simulation and sequential indicator simulation, to simulate reservoir properties (see e.g., Debeye et al., "Stochastic inversion", The Strategic Importance of Oil and Gas Technology, Proceedings of the 5th European Union Hydrocarbon Symposium, Edinburgh, U.K., 1997, v. 1, p. 166–175 and Debeye et al., "Method for estimating or simulating parameters of a stratum structure", European Patent Application No. EP 0 864 882 A2, published Sep. 9, 1998). The simulated values are systematically perturbed until a synthetic seismic trace calculated for a particular location within the model matches the observed seismic data trace for that location. This process is repeated until all traces are matched.

U.S. Pat. No. 5,838,634 describes a similar model-based inversion approach, except that geostatistical algorithms are not used in the geologic-modeling process. Rather, a simulated-annealing algorithm is used to assess not only the match between the synthetic seismic traces and the actual seismic traces, but also the match between (1) statistics that describe the distribution of rock properties within the geologic model, and (2) other specified geological and geophysical criteria. Such criteria could include lithofacies proportions, histograms of porosity by lithofacies, 3-D measures of lithofacies and porosity continuity (variograms), etc. The match between the statistics calculated for the tentative model and the geological and geophysical criteria is assessed, and the rock properties assigned to each block in the model are perturbed until there is a match within specified limits.

In the procedures described above, as with most geologic-modeling procedures, the geologic interfaces used in constructing the models are fixed, i.e. they are not perturbed during modeling. Thus, if the geologic interfaces are positioned inaccurately, the resulting geologic model will likely be an erroneous representation of the subsurface earth volume of interest.

Geologic Interfaces that Define Zones and Regions in the Subsurface

Structural and stratigraphic surfaces are important features of the earth's subsurface. These geometrical entities represent the results of tectonic and depositional processes that are important for development of the geologic conditions in the subsurface. Surfaces are also important for geologic modeling. The geologic surfaces are pictured in the form of contour maps, and are estimated and represented by computer grids generated by computer programs. A computer grid or surface typically consists of a series of (X, Y) locations, with one or more depth (Z) or time (T) values assigned to each location. These (X, Y) locations are referred to as "nodes." The nodes may form an ordered array (e.g., a pattern of equi-dimensional rectangles) or a set of complex shapes (e.g., a pattern of space-filling quadrilaterals of varying sizes and shapes, or sets of Delauney triangles). Various computer programs are available to generate such computer grids using data interpreted from wells, seismic surveys, or other sources.

Computer grids influence generation of most 3-D geologic models. Such grids describe the top and base of the model, thereby defining the volume of rock that constitutes the model. Grids are also used to define subintervals within the model that represent different layers (e.g., formations). Computer grids typically are used to define stratigraphic correlations within the model, that is, the grids indicate the depths at various locations that represent the same geologic time or depositional event.

Two surfaces that are stratigraphically adjacent to each other define an interval, one surface representing the top and the other the base of the interval, hereinafter referred to as a "zone." A geologic model may have a single zone, but more commonly models consist of several zones, each defined by gridded surfaces. The top of one zone typically is defined by the same grid as the base of the overlying zone. Because the zones in a model are deposited under different geologic conditions, it is likely that rock properties differ between zones.

In nature, surfaces intersect each other. For example, an unconformity is an erosional surface that truncates underlying surfaces. Such intersections must be incorporated into the computer grids used for generating 3-D geologic models. Stratigraphic relations that are commonly used in geologic modeling are conformity, truncation, and baselap. Special operations, known to persons skilled in the art of geologic modeling, are required for introducing these stratigraphic relations into a geologic model.

Computer grids used to define zones divide the model into layers vertically, with each zone possibly having different rock properties. Within a zone, local variations in rock properties may also occur (for instance, facies changes from one depositional environment to another within a zone). Because of the need to specify different rock properties, modeling programs may introduce boundaries to separate different facies or other features within a zone. These boundaries commonly and conveniently are put in the form of polygons (i.e., ordered, closed sets of X-Y locations), but unclosed polylines or other definitions may be used. The volume enclosed by one or more of such boundaries will hereinafter be referred to as a "region." Regions typically are restricted to a single zone, but they may be defined to include two or more zones, or to be contained within a portion of a single zone. As with zones, regions often represent different geologic conditions and rock properties.

Adjustment of Geologic Interfaces in the Geologic Model

As noted above, geologic interfaces used in constructing a geologic model typically are fixed, in that their positions are not adjusted during the geologic-modeling process. There have been a few published exceptions to this practice. Roggero and Hu ("Gradual deformation of continuous geostatistical models for history matching", SPE-49004, Proceedings of the 1998 Annual SPE Technical Conference, p. 221–236) developed an optimization algorithm to simultaneously condition a limited number of geologic-model parameters to historical field data. In their example, two independent geostatistical model realizations were linearly combined to produce a set of additional model realizations. Each of these realizations had a different though equally probable shape for the reservoir's top structural surface (one of two parameters modeled). From this set of realizations, an optimum realization was identified as that having simulated production results that are most similar to actual field production data. This optimum realization was then linearly combined with a third independent model realization resulting in a second set of additional realizations, and from this set a second optimum realization was identified. This process was repeated until a convergence criterion was met, resulting in a model realization consistent with the historical field data. There are several limitations to this procedure. For example, the top structural surface is not optimally adjusted during construction of the geologic model. Rather, a set of equally probable model realizations is generated and, from this set, the optimum realization is selected. This is not necessarily an efficient process, because many model realizations may have to be constructed before an optimum realization can be identified. In addition, the resulting model is only consistent with field data; there is no attempt to ensure consistency of the structural surface with modeled rock properties or with any other data measurements or target assumptions.

Rahon et al. ("Identification of geological shapes in reservoir engineering by history matching production data", SPE-48969, Proceedings of the 1998 Annual SPE Technical Conference, p. 139–149) similarly used field production data to modify parameters of a geologic model. In their work, structural faults and depositional-facies-object boundaries (e.g., channel boundaries) were modified to be consistent with the field production data. Faults were assumed to be vertical, spatially defined by two nodes (end-points), and assigned a fluid-transmissibility value. Channel-facies objects were assumed to have vertical boundaries, spatially defined by a limited number of nodes along the interface, and were assigned permeability values different from the surrounding non-channel facies. According to this method, a tentative model is constructed and production is simulated to generate synthetic values of production rates and pressures at well locations. These synthetic measures are compared to actual field measures, and the nodes of the faults or facies boundaries are adjusted until an objective function, measuring the difference in the real and synthetic values, is minimized. It is not clear what, if any, constraints are applied to control movement of the nodes. As with the Roggero and Hu method described above, the resulting model is only consistent with field data; there is no attempt to ensure consistency of the fault or boundary positions with modeled rock properties or with any other data measurements or target assumptions. There are no obvious constraints controlling adjustment of the nodes. Rahon et al. previously published a similar study ("Identification of geological shapes in reservoir engineering using well tests and history matching", SPE-38656, Proceedings of the 1997 Annual SPE Technical Conference, p. 141–153), except that well test data were used to modify the parameters of the geologic model.

U.S. Pat. No. 4,679,174 describes a procedure to optimize a 2-D model of subsurface earth layers (see also, Gelfand and Larner, "Seismic lithologic modeling", The Leading Edge, 1984, p. 30–35). In this procedure, a tentative 2-D geologic model is constructed that consists of layers defined by horizons, presumably interpreted from the seismic data. Additional horizons are arbitrarily inserted within these layers, creating many layers of varying thickness. Acoustic-velocity and bulk-density values are assigned at selected model control points at each horizon. Acoustic-velocity, density, and depth values are interpolated between these control points at defined locations, referred to as calculation points. These parameters at calculation points are allowed to vary over specified ranges, and synthetic seismic traces are calculated for each change in the model using a convolutional modeling process. The parameters are varied until the synthetic seismic traces are in agreement with observed seismic traces. The result is a 2-D model of subsurface earth layers that is consistent with stratal features in the seismic data.

A procedure similar to the one described in U.S. Pat. No. 4,679,174 has been published by several different authors (see e.g., Duboz et al., "Moving to a layered impedance cube: advantages of 3D stratigraphic inversion", First Break, 1998, p. 311–318 and Gluck et al., "Robust multichannel stratigraphic inversion of stacked data", Developments in Geophysical Techniques Relating to Finding the Subtle Trap, Norwegian Petroleum Society, 1990). According to this procedure, a tentative 3-D geologic model is created, with stratal geometries defined by interpreted seismic horizons. Acoustic-impedance values are assigned to layers bounded by these horizons (referred to as macro layers), and impedance values may vary laterally and vertically. This continuous impedance field is sampled at regular intervals. Vertical sampling within each macro layer is defined by interpolating strata (micro layers) to adequately represent layer geometry, though not necessarily to conform to the geometries of seismic reflectors. At each sample location, parameters of impedance and seismic reflection time are assigned. These parameters are perturbed, and synthetic seismic traces are calculated for each change in the model using a convolutional modeling process. The parameters are varied until the synthetic seismic traces are in agreement with the observed traces. The a priori model is constrained in terms of impedance bounds and lateral continuity. Similar constraints are not applied to control the perturbation of seismic time at sample locations. The resulting model consists of a layer geometry that conforms to strata features in the seismic data.

In the procedures described in U.S. Pat. No. 4,679,174 and the publications by Duboz et al. and Gluck et al., surfaces within the model are adjusted while the model is being constructed. However, the resulting models are consistent only with the seismic data, and not with modeled rock properties or with any other data measurements or target assumptions. Impedance or acoustic-velocity and density values may be constrained in the model, but there are no constraints controlling the perturbation of depth or time values. Thus, the resulting product is not a geologic model of rock properties for a subsurface earth volume, but simply a forward seismic model of the layered subsurface.

From the foregoing, it can be seen that there is a need for a procedure in which the geologic interfaces within a 3-D geologic model can be adjusted during the model-building process so that the resulting model is consistent with data measurements and target assumptions for the subsurface earth volume being modeled, including available seismic data. Preferably, such a procedure should be automated so that the optimization process can be performed by a computer, resulting in a more accurate model of the subsurface earth volume of interest, but requiring negligible additional time and effort. The present invention satisfies this need.

SUMMARY OF THE INVENTION

The present invention is a process for constructing a 3-D geologic model of a subsurface earth volume containing one or more geologic interfaces. In one embodiment, the inventive process comprises the steps of (a) generating a tentative geologic model of the subsurface earth volume, the tentative geologic model comprising a three-dimensional array of contiguous model blocks, each model block having tentative values of one or more rock properties assigned thereto, the tentative geologic model containing tentative positions for the one or more geologic interfaces; (b) specifying training criteria which define the spatial attributes of geologic interfaces and the characteristics of rock properties in the subsurface earth volume; (c) calculating statistics that describe the spatial attributes of the tentative to geologic-interface positions and the characteristics of the tentative rock-property values in the tentative geologic model; and (d) comparing statistics calculated in step (c) with corresponding training criteria specified in step (b) and either (1) if the statistics do not match the training criteria within specified limits, perturbing the tentative position within the tentative geologic model of at least a portion of at least one of the geologic interfaces, updating the tentative geologic model, and repeating steps (c) and (d), or (2) if the statistics match the training criteria within the specified limits, accepting the tentative geologic model as the three-dimensional geologic model for the subsurface earth volume.

In a preferred embodiment, the process further includes the step of perturbing the tentative value of at least one rock property for at least one of the model blocks prior to updating the tentative geologic model. In this embodiment, the tentative positions within the tentative geologic model of the geologic interfaces are preferably moved as required to be consistent with the perturbed rock-property values.

Preferably, the training criteria used to assess the tentative geologic model include the match between synthetic seismic traces derived from the tentative geologic model and actual seismic data traces for the subsurface earth volume being modeled.

In the event that one or more wells have been drilled in the subsurface earth volume, then rock-property values obtained from these wells should be assigned to model blocks representing portions of the subsurface earth volume that are penetrated by the wells. Similarly, geologic-interface locations obtained from wells should be inserted into the model at positions corresponding to their locations in the wells. Preferably, these rock-property values and geologic-interface positions at the wells are accepted as correct, and are not subject to perturbation.

BRIEF DESCRIPTION OF THE DRAWINGS

The present invention and its advantages will be better understood by referring to the following detailed description and the attached drawings in which.

DETAILED DESCRIPTION OF THE PREFERRED EMBODIMENTS

In the following detailed description, the invention will be described in connection with its preferred embodiments. However, to the extent that the following description is specific to a particular embodiment or a particular use of the invention, this is intended to be illustrative only, and is not to be construed as limiting the scope of the invention. For example, the invention will be described primarily in terms of geologic models comprising 3-D arrays of model blocks or cells. Nevertheless, the invention is equally applicable to other geologic-model configurations, such as geologic models constructed using 3-D arrays of model points instead of model blocks. Accordingly, the present invention is not limited to the specific embodiments described below, but rather the invention includes all alternatives, modifications, and equivalents falling within the true scope of the appended claims.

The present invention is a process for constructing a 3-D geologic model of a subsurface earth volume in which the positions of geologic interfaces within the model are adjusted as the model is being constructed. The geologic interfaces are adjusted in such a way as to be consistent with modeled rock properties and with data measurements and target assumptions used in constructing the model. This process for merging 3-D geologic modeling with simultaneous adjustment of geologic interfaces in the model produces geologic models that are consistent with geologic and geophysical information that describe the subsurface volume being modeled, but also with surfaces and boundaries that define the spatial framework of the subsurface volume. The simultaneous (versus sequential) nature of this process is designed to ensure consistency of the geologic interfaces with the modeled rock properties, data measurements, and target assumptions used in constructing the model.

Figure 1:
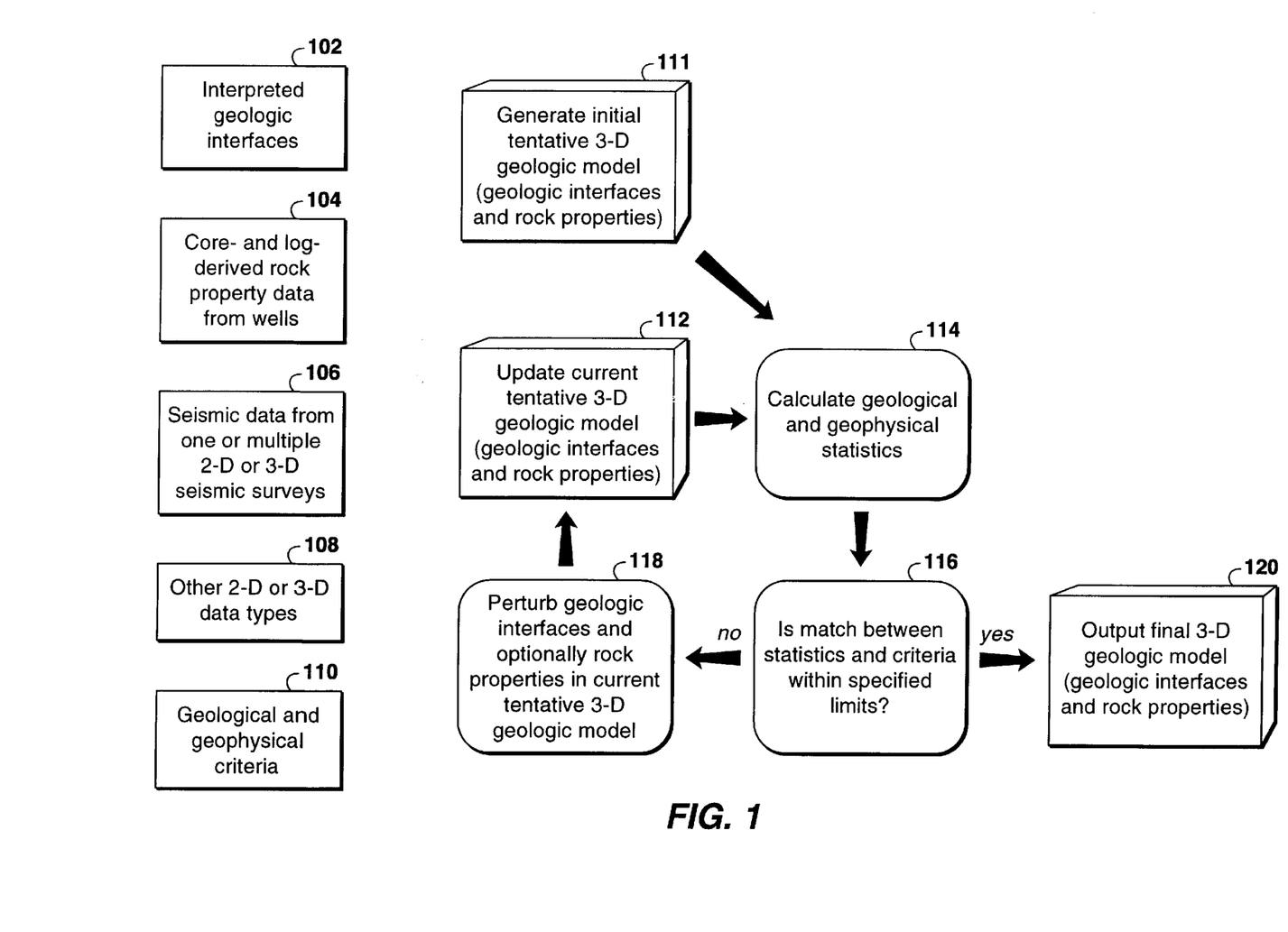
FIG. 1 illustrates the types of data and information used in practicing the present invention and provides an overview of the inventive process.

Turning now to FIG. 1, the present invention may utilize several different types of data and information for modifying geologic interfaces while simultaneously building the geologic model. As examples, without thereby limiting the scope of the invention, the inventive process may utilize interpreted geologic interfaces defining zones and regions with specific rock properties (reference numeral 102), core- and log-derived rock property data from wells (reference numeral 104), fully migrated seismic data from one or more 2-D or 3-D seismic surveys (reference numeral 106), other 2-D or 3-D data types that could be used to indicate distributions of rock properties (reference numeral 108), and geological and geophysical criteria that define the desired distribution and relations of rock properties and spatial attributes of geologic interfaces in the geologic model (reference numeral 110). The interpreted geologic interfaces 102 and the geological and geophysical criteria 110 are required for practice of the present invention. The other data types are optional; although better results typically are obtained if additional data types are utilized, particularly the well data 104 and seismic data 106.

Structural and stratigraphic surfaces that define zones within the model may be obtained or derived in several ways that are known to persons skilled in the art of geologic modeling or computer mapping. Surfaces may be created in the form of contour maps or grids using data derived from seismic surveys, wells, or both. If the model is constructed in terms of depth, surfaces interpreted from seismic data must be converted from seismic time to depth. The process for doing so is well known to persons skilled in the art. If little data are available, the surfaces may be created as hand-drawn maps that are based on geological concepts and interpretation. Alternatively, the surfaces may be arbitrary, with the expectation that the modification process will change them into correct configurations. In general, best results will be obtained if the initial positions of the surfaces within the model are as correct as possible.

Boundaries that define regions within the model may be obtained or derived in several ways that are known to persons skilled in the art of geologic modeling. Such boundaries may be defined as polygons interpreted from seismic maps and sections, well interpretations, or geological concepts. The regions defined by these boundaries may be specific to a single geologic zone, such as a stratigraphic sequence, or may include multiple geologic zones. A boundary may also be defined as a three-dimensional body that encompasses a specified volume within the geologic model.

This volume would most commonly be interpreted from 3-D seismic data. Boundaries interpreted from seismic data must be depth-converted if the model is constructed in terms of depth. Though these boundaries may be arbitrary, with the expectation that the modification process will change them into correct configurations, best results typically will be obtained if the initial positions of the boundaries within the model are as correct as possible.

FIG. 1 also provides an overview of the process for using the present invention to modify geologic interfaces while simultaneously building a geologic model. First, using methods known to persons skilled in the art of geologic modeling, a tentative 3-D geologic model is generated by assigning one or more tentative rock-property values to each model block and placing tentative geologic interfaces within the model (reference numeral 111). This model may be built in depth or in seismic time.

Next, geological and geophysical statistics that describe (a) spatial attributes of tentative geologic interfaces and (b) characteristics of tentative rock properties in the model are calculated (reference numeral 114). These statistics may be based on various criteria. Statistics that relate to rock properties are known to persons skilled in the art of geologic modeling (e.g., zones or regions that are defined contain consistent rock-property values and consistent two-point variograms for these properties). Other statistics, not necessarily known to persons skilled in the art of geologic modeling, would describe geologic interfaces that are restricted from moving too great a distance from their initial positions, and geologic interfaces that maintain a specified smoothness. Several statistics are available for determining if the spatial attributes of tentative geologic interfaces meet required criteria. Examples of such criteria include, but are not limited to, the following:

Lateral or vertical movement of a geologic interface. A possible statistic that compares the most likely and current node values would be given by $\Sigma D_j^2$, where $D_j$ is the distance a node has shifted, and the sum is over all nodes j.

Smoothness of modified geologic interfaces. Several statistics may be used. For example, a variogram to specify the overall configuration that the surface is to attain may be used, or local curvature may be used to describe roughness. Such statistics may be compared to the similar statistics of the initial, most likely configuration of the interface.

Next, the match between the geological and geophysical statistics and the corresponding, desired criteria is assessed (reference numeral 116). If the match is not within specified limits:

a) Perturb the geologic interfaces laterally or vertically, as appropriate, so that their positions are consistent with the desired criteria (reference numeral 118).

b) Optionally, perturb the rock-property values in the tentative geologic model (reference numeral 118).

c) If the perturbation provides an improved model, update the tentative model and statistics (reference numeral 112).

d) Recalculate geological and geophysical statistics (reference numeral 114) and compare the results to the desired criteria (reference numeral 116).

If the match is within specified limits, output the final geologic model (i.e., rock-property values and the modified geologic interfaces) to a file (reference numeral 120).

As illustrated in FIG. 1, the inventive method adjusts geologic interfaces through a process of optimization. This optimization may be quantitatively based on mathematical functions (using stochastic or deterministic methods) or it may be qualitatively based. The statistics chosen to describe the spatial attributes of tentative geologic interfaces within the model are not restricted and may be any convenient form that specifies desired properties. The geologic-interface perturbations and optional rock-property perturbations are carried out using any of a number of numerical algorithms known to persons skilled in the art of geologic modeling.

In one embodiment of the invention, only one interface node is perturbed at a time. Another embodiment of the invention is to simultaneously perturb the positions of a group or cluster of interface nodes. Moving several nodes at once keeps the surface smooth, and reduces the likelihood of erratic, unrealistic surfaces from resulting. Such a process would modify all nodes within a specified distance of the node in question, with the degree of adjustment being applied to a greater degree for nodes near the node in question and to a lesser degree for nodes away from the node in question.

As indicated above, the present invention does not require the simultaneous perturbation of both tentative geologic interfaces and tentative rock properties. Rather, perturbation of the rock-property values is optional. An alternative embodiment of the invention is to modify only the geologic interfaces, but not perturb the rock properties in the geological model. In some instances, a geologic model obtained from any of several possible methods may be considered as correct, with the exception of geologic interfaces that are not necessarily associated with construction of that models The invention may be used to adjust or modify these geologic interfaces so as to make them consistent with the current rock properties assigned to the model, and possibly with data measurements and target assumptions that may or may not have been used in constructing the geologic model. Adjustments may be made by perturbing only geologic interfaces (not rock-property values) and determining if shifts would improve geologic interface statistics and better match statistics calculated from the rock-property block values.

In an alternative embodiment, the three-dimensional array of model blocks is replaced by a three-dimensional array of discrete model points. Preferably, at least a portion of the discrete model points correspond to sample points in a three-dimensional seismic data volume for the subsurface earth volume. Rock-property values are assigned to each of these model points in the same manner as discussed above for model blocks. In this embodiment, geologic interfaces would define zones and regions of model points in the model, rather than zones and regions of model blocks.

Preferably, the present invention is automated with the use of a computer. Automation eliminates the need for manual, iterative interpretation of the geologic interfaces, thus achieving the desired model sooner and with less effort. Automation also guarantees an objective and reproducible solution. Persons skilled in the art of geologic modeling could easily develop computer software for practicing the invention based on the teachings set forth herein.

Figure 2A:
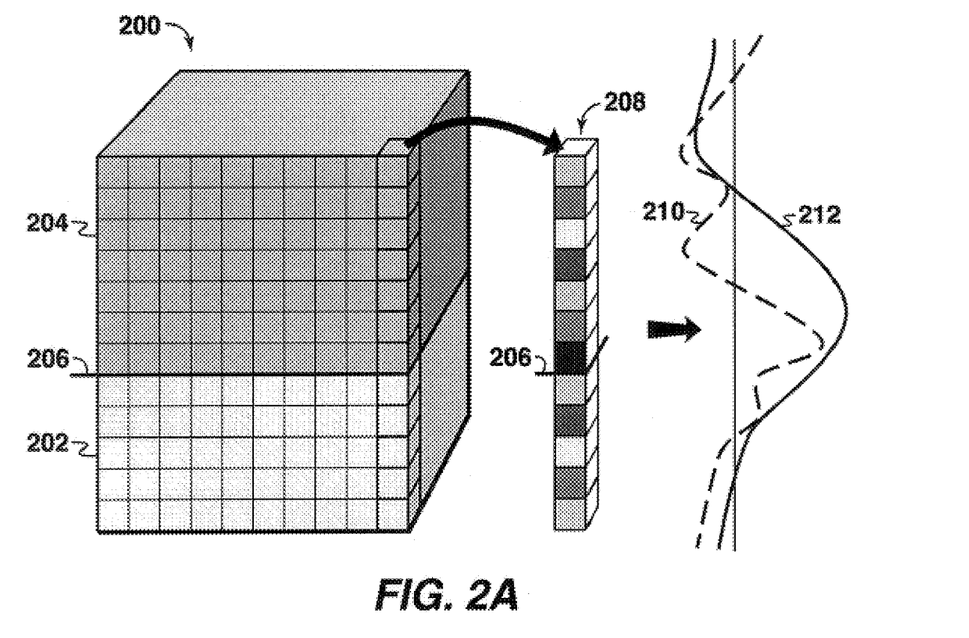
FIGS. 2A and 2B schematically illustrate the present invention, as applied to adjustment of a structural or stratigraphic surface between two subsurface zones.
Figure 2B:
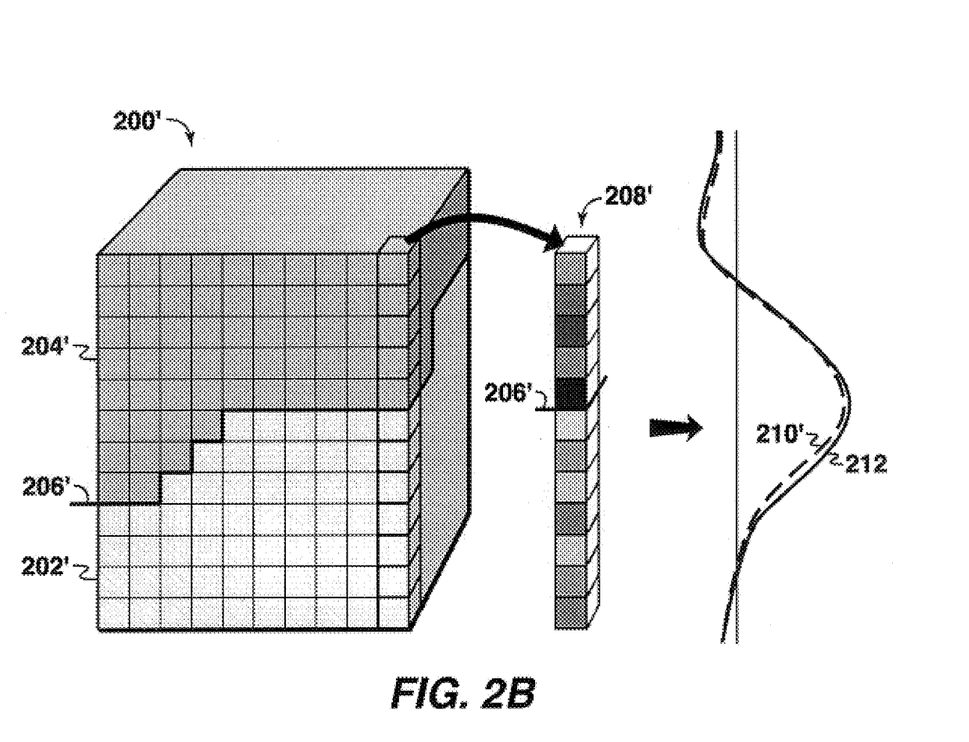

In a preferred embodiment of the invention, the rock properties in the model are perturbed simultaneously with the geologic interfaces, using geological and geophysical constraints. FIGS. 2A and 2B schematically illustrate this embodiment of the invention, as applied to the adjustment of a structural or stratigraphic surface. FIG. 2A depicts an initial geologic model 200 for a subsurface earth volume. Initially, the model 200 consists of two zones 202, 204 separated by a horizontal, planar surface 206. In mode-based seismic inversion, a synthetic seismic trace is calculated for each column of model blocks in the model (or at least for each column of model blocks that represents a location where an actual seismic data trace exists). FIG. 2A shows a column of model blocks 208 extracted from geologic model 200. Impedance values for this column of model blocks are calculated from rock-property values arbitrarily assigned to the model blocks. These impedance values are then used to derive synthetic seismic trace 210 which, obviously, is a rather poor match for actual seismic data trace 212 for the location in question. Therefore, the rock-property values assigned to the model blocks in column 208 and/or the location of surface 206 within column 208 are incorrect.

FIG. 2B shows the same geologic model 200' after perturbation. The rock properties assigned to the model blocks in column 208' and the position of surface 206' within column 208' have been perturbed until consistent with applicable geologic and geophysical constraints. The synthetic seismic trace 210' calculated from the perturbed rock-property values and surface position is obviously a much better match for actual seismic data trace 212. As will be well known to persons skilled in the art of geologic modeling, a large number of perturbations may be required to move from the initial model shown in FIG. 2A to the final model shown in FIG. 2B.

Figure 3A:
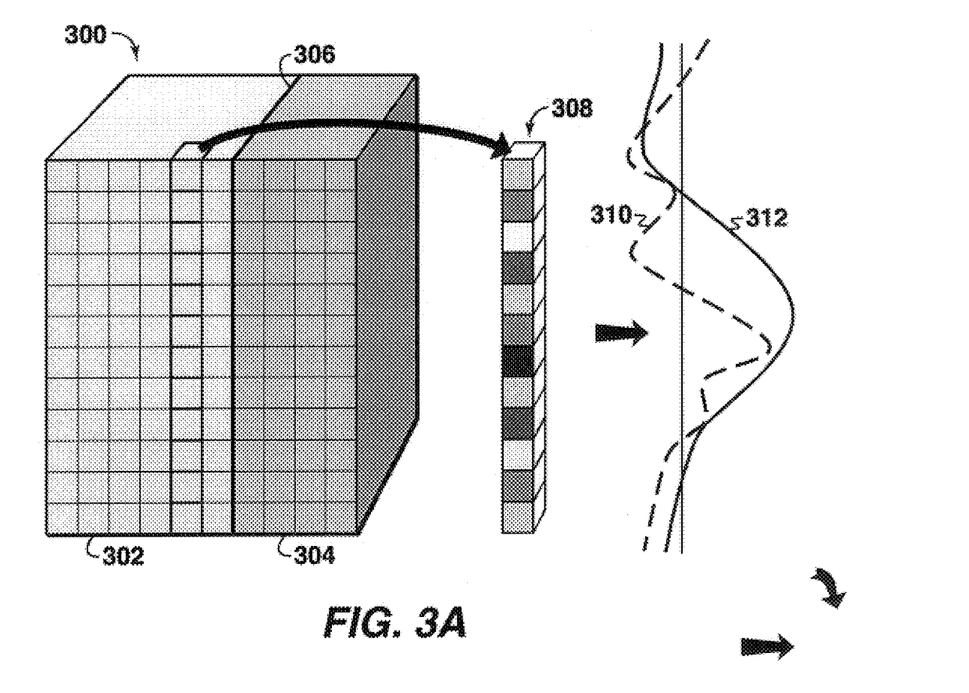
FIGS. 3A and 3B schematically illustrate the present invention, as applied to adjustment of a boundary between two subsurface regions.
Figure 3B:
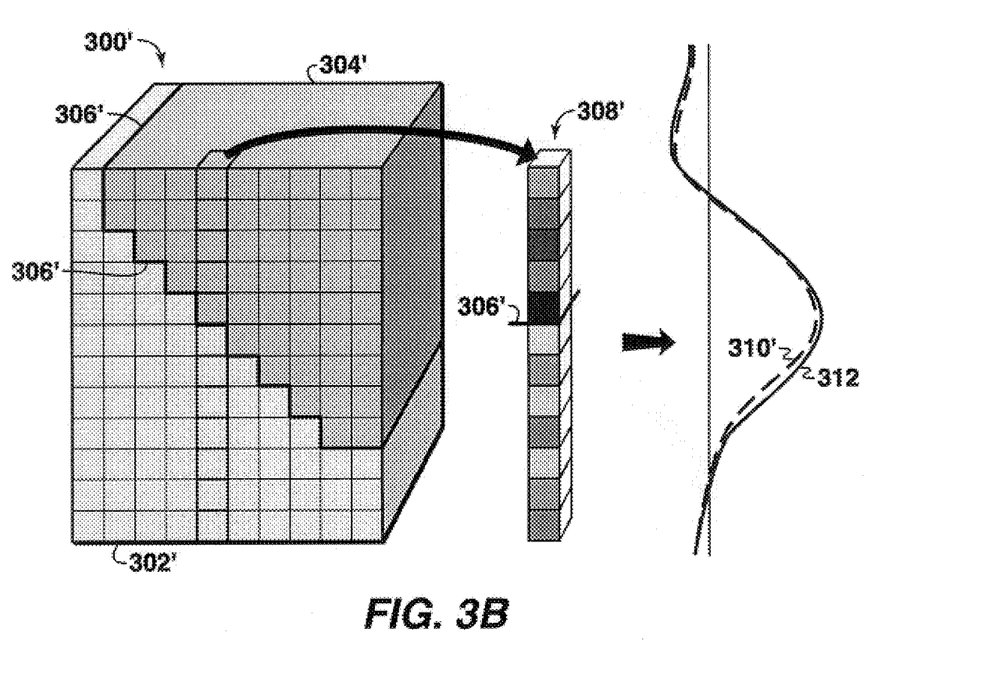

FIGS. 3A and 3B are analogous to FIGS. 2A and 2B, except that the geologic interface involved in FIGS. 3A and 3B is a boundary between two distinct subsurface regions (e.g., two different facies within a zone). The initial geologic model 300 contains two regions 302 and 304 separated by a vertical, planar boundary 306. The synthetic seismic trace 310 calculated from the model blocks in column 308 (all of which initially are located in region 302) is a poor match for actual seismic data trace 312.

As shown in FIG. 3B, after perturbation the position of boundary 306' within model 300' has been changed significantly. The model blocks in column 308' now lie partially in region 302' and partially in region 304'. The synthetic seismic trace 310' calculated from column 308' is obviously a much better match for actual seismic data trace 312.

Although not shown in FIG. 2A, 2B, 3A, or 3B, geologic interfaces that define both zones and regions can be perturbed simultaneously while building a geologic model.

Figure 4A:
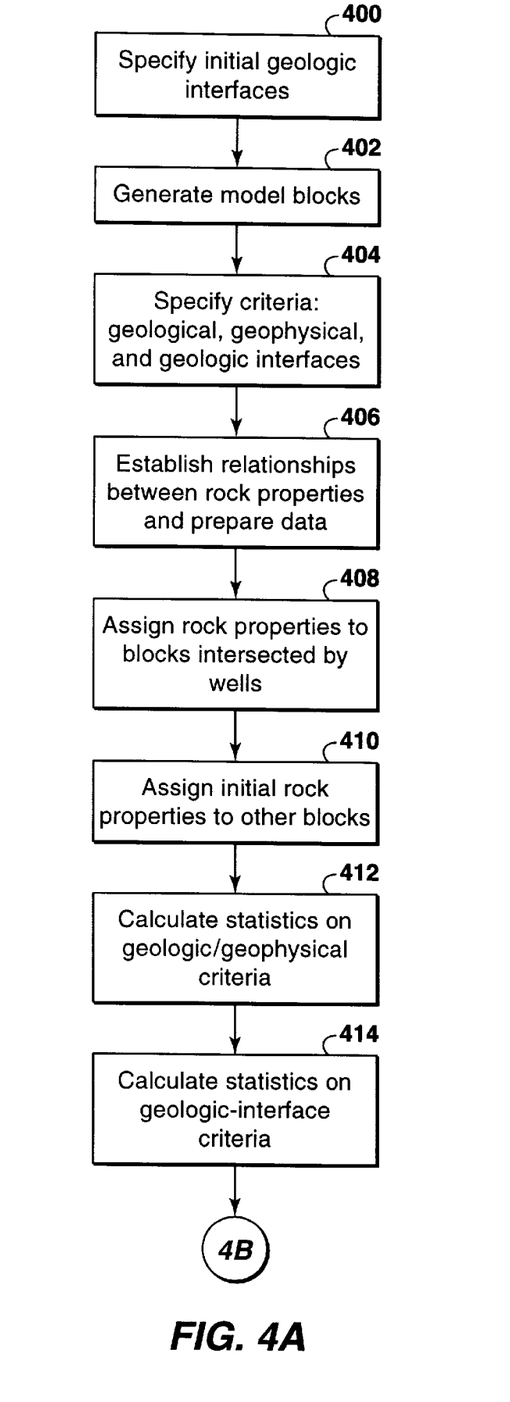
FIGS. 4A and 4B provide a detailed flowchart for one embodiment of the present invention.
Figure 4B:
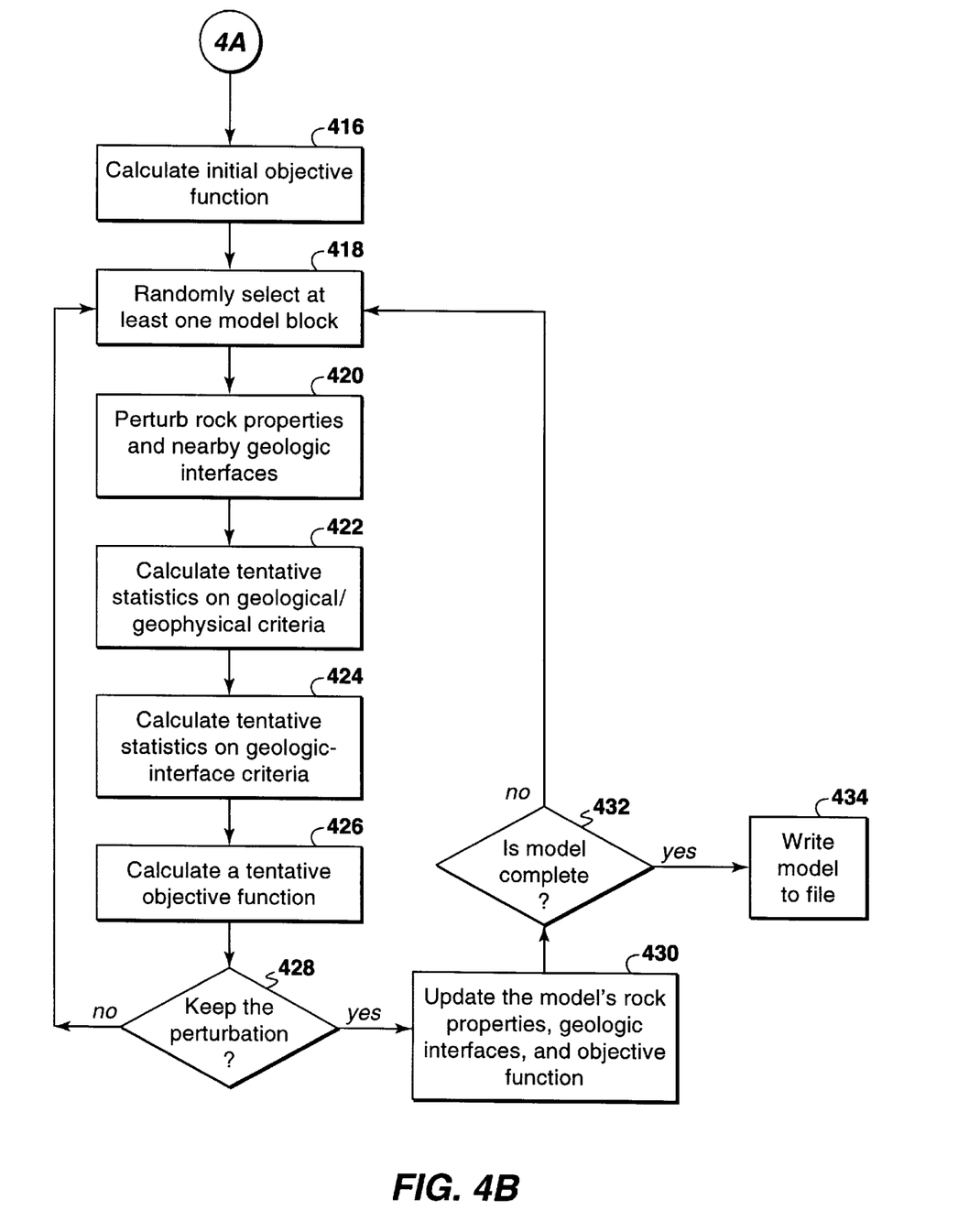

FIG. 4 is a flowchart showing the detailed steps that comprise a preferred embodiment of the present invention. In general, steps 400 through 416 involve data preparation and model initialization, while steps 418 through 434 are optimization steps for improving the fit of the geologic model to specified criteria. The following description will refer to a geologic model built in depth; however, building a model in seismic time, with obvious modifications in the process, is equally preferred.

The initial step of the inventive process is to specify initial positions of the geologic interfaces within the model (step 400). Preferably, the initial positions specified are the most likely representations of the corresponding geologic interfaces in the subsurface, and are generated with as much consistent data as possible.

At step 402, an array of 3-D model blocks that comprises the geologic model is created. Model blocks may be defined as having constant dimensions, or they may vary one from another in size and shape. It is only necessary that the non-overlapping model blocks jointly describe the total volume of rock being modeled. Preferably, the model blocks are defined so that each block lies entirely within a single region of the model. The complete set of model blocks should represent all portions of the subsurface to be modeled, taking into account structural and stratigraphic features. At this stage, each model block has been assigned a position and volume in the subsurface, but has not been assigned rock properties.

Next, at step 404, geological, geophysical, and geologic-interface training criteria or rules for modeling are specified. The preferred mode of operation is to incorporate as many rock-property variables and criteria as possible in order to remove ambiguity and enhance uniqueness. For this reason, the modeling process should include several geological and geophysical criteria that the model must meet, in addition to criteria that define the spatial attributes (e.g., position, smoothness, curvature, etc.) of the geologic interfaces. Typical examples of geological criteria include measures of 3-D spatial continuity (e.g., variograms) of lithofacies, maps of average porosity within zones, and frequency distributions of acoustic impedance. Typical examples of geologic interface criteria include limits on the extent a geologic interface may be moved vertically or laterally, consistency of other criteria relative to zones and regions defined by the geologic interfaces, and degree of smoothness required in the geologic interfaces. An example of a geophysical criterion is a match between observed seismic traces and synthetic seismic traces calculated using rock properties in the model. All such criteria are referred to herein as "components."

Preferably, the various components are defined in mathematical terms. This allows comparison of desired values with those calculated from a potential model. Combining components into a mathematical objective function summarizes the overall match between the geologic model and the desired criteria or rules. This allows integration of numerous types of information and relationships into the model.

In this step (step 404), the user specifies values that each component is desired to attain in the final model. A typical example of a lithology-based criterion is the percentage of each lithology type (e.g., 35% sandstone and 65% shale) to be found in the final model. An example of an impedance criterion is the histogram of impedance in sandstone that is desired in the model. The criteria may be specified in many ways, including constants, variogram models, frequency distributions, and gridded maps, among others. It is also convenient to calculate such training information from separately created 2-D arrays or 3-D models.

An important consideration in defining these criteria is to take into account stratigraphic correlations. Lateral variograms, for example, should be calculated to measure continuity parallel to stratigraphic surfaces, not just horizontally at a given depth. If structural dip and stratigraphic correlations are not considered, the horizontal variogram will cross strata and represent non-correlative rocks. This concept is discussed further below.

It is rare that one set of geologic and geophysical criteria will be appropriate for describing the distribution of rock properties for all portions of a reservoir. For instance, the reservoir may have been divided into geological zones or regions on the basis of changes in lithology and porosity. Even within a single geological zone, regions or groups of blocks may have different characteristic distributions of properties, depending on their particular facies or association of facies. For such cases, criteria should be specified separately for geological zones and for regions within zones.

Next, at step 406, geological and geophysical relationships between rock properties are established and related rock-property data is prepared. Some variables that are to be modeled or used in calculations (e.g., impedance) may not be directly observed or measured. Relationships may be established to obtain these variables from the others. For example, straight-line interpolators may relate acoustic velocity of the rock and fluid to porosity (Wyllie's equation), and relate rock and fluid density to porosity. Determination of bulk density and acoustic velocity for a given value of porosity then allows calculation of acoustic impedance.

Rock properties observed in wells are assigned to model blocks intersected by wells at step 408. In the preferred method, rock properties observed in wells should be honored in the final model. The preferred mode of operation is to assign rock-property values directly to those blocks intersected by wells. This step consists of (a) determining which blocks are intersected by the boreholes of the wells, and (b) placing the values observed at each intersected borehole segment into the corresponding blocks. These assigned values are left unchanged during the perturbation process.

Next, at step 410, an initial model is prepared by assigning rock properties to those blocks that do not contain well data. This step may be done in any convenient, even arbitrary, way; a random process is typically used. It is not necessary that the assigned rock properties meet any of the geological and geophysical constraints that will control the modeling process in the following steps, but the preferred method is to form an initial model that is at least somewhat consistent with the criteria.

At step 412, statistics to determine whether the modeled rock properties agree with geological and geophysical criteria are calculated. Geological and geophysical components normally must be employed to constrain the model sufficiently to produce a reasonable geologic model. Use of such components allows integration of various types of information and relationships into the model.

The modeling process requires that the user provide desired components corresponding to the observations or training information. Component statistics are calculated from the properties in the initial model and are then compared to the desired values. For example, consider percentage of each lithology in the model as a criterion; a typical comparison statistic for this component might be the sum of squares of the differences between the calculated, model-wide lithology percentages and the desired percentages. A second example considers the two-point variogram. Here a typical comparison statistic is the sum of squares of the differences between the calculated, model-wide variograms and the desired variogram values, with the sums calculated over all specified lag distances and directions.

Some criteria are controlled by stratigraphic correlations (e.g., variogram statistics), so the preferred mode of operation for stratigraphic statistics is to take into account correlations between blocks in the model. For instance, if a bed is dipping, a variogram should not be calculated horizontally from one block to adjacent blocks, but instead the degree and direction of dip should be determined, and the variogram should be calculated for those blocks that correlate stratigraphically to the block in question. This process should be followed when calculating all such stratigraphically controlled criteria. Determination of correlative layers typically is based on surfaces in the form of computer grids.

To calculate a statistic for geophysical trace criteria, it is necessary to first calculate or determine impedance values for all blocks in the model using the modeled rock properties and other information (e.g., Poisson's ratio for AVO calculations), and then to compute a forward seismic model (i.e., a synthetic seismic trace) for each vertical stack of model blocks in the model. This process is well known to practitioners of seismic modeling. Since each observed and synthetic trace consists of a series of time-amplitude pairs, the synthetic seismic traces may be compared to the observed seismic traces to measure their degree of agreement by, for example, calculating the root-mean-square (RMS) difference (or simply sum-of-squares of differences, SSD) between corresponding amplitude values for all pairs in a trace and over all traces. RMS or SSD values near zero imply best agreement.

The next step of the inventive process is to calculate statistics to determine if the spatial attributes of the tentative geologic interfaces meet the geologic-interface criteria (step 414). Several statistics are available for determining if geologic interfaces meet required criteria. As noted above, examples of such criteria include, but are not limited to, limits on lateral or vertical movement of a geologic interface and smoothness of modified geologic interfaces.

For the lateral or vertical movement criterion, the initial interface position for a point k is defined to be $B_k$ and the adjusted (tentative) position is defined to be at $BT_k$. If the distance between the initial position for the interface and the adjusted position is indicated by $D_k$, then a possible statistic that compares the initial and adjusted positions is $\Sigma D_k^2$, where the sum is over all interface positions k. By definition, the initial value of this statistic would be zero.

Several statistics may be used for the smoothness criterion. For example, a variogram may be used to specify the overall shape that the geologic interface is to attain. The statistic could then be the sum of squares of the differences between the calculated variogram and the desired variogram values. Another finer-scale method would place small windows about every node in the geologic interface. Within each window, a value could be calculated (e.g., maximum or average curvature; maximum deviation of node values in window); the statistic could compare that set of calculated values with user-specified targets (e.g., means or histograms). Other statistics that could be used include the total length of the interface perimeter or piecewise splines.

At step 416, an initial objective function is computed. Preferably, the comparison statistics for the geological, geophysical, and geologic-interface components are combined into one objective function. Although the objective function can be defined in many ways, typically it is in the form of a linear combination of the individual components:

$$OBJ = \Sigma W_i \, COM_i$$

where $W_i$ represents a weight assigned to the i-th component, $COM_i$, and the sum is over all components being used for building the model. The preferred method of defining components of the objective function is to make them non-negative and to force them to reach an optimum value (perfect agreement) at zero. If this is done for all components, the objective function will have similar properties.

The preferred method of defining weights $W_i$ associated with each component is to let $W_i = V_i \, U_i$, where $V_i$ represents a weight that takes into account the variability (e.g., inverse of the variance) of the component, and $U_i$ is a user-defined, relative weight for the component. User-defined weights, $U_i$, for the components may also be defined separately for each zone and region and incorporated into the components rather than in $W_i$. It is convenient, but not required, to rescale the weights $W_i$ so that OBJ=1.0 for the initial model.

At step 418, one or more model blocks are selected, and at step 420 the blocks' rock properties and nearby geologic interfaces, if any, are perturbed. In one embodiment, only one model block is selected at random. In another embodiment, multiple blocks are selected and their properties and nearby geologic interfaces, if any, are perturbed simultaneously.

The optimization process used in the present invention requires that the model's rock properties and geologic interfaces be systematically perturbed until a better match is made to the desired criteria, that is, until the objective function attains an optimum value. Any of several optimization processes can be used to determine if a given perturbation makes the model attain a better fit. The required characteristics of the optimization process are that properties of the individual blocks and the positions of geologic interfaces can be modified, an objective function can be defined to indicate degree of agreement, and perturbations can be accepted or rejected.

In one embodiment of the present invention, simulated annealing is used as the optimization process because of its ability to avoid entrapment in to local minima in the objective-function space. The maximum a posteriori optimization method is also effective as another embodiment because it requires fewer trials to find improvements in the objective function. Other potential optimization procedures include Markov-chain Monte Carlo methods, gradient and similar deterministic methods, and genetic algorithms, as well as combinations of algorithms. The description of the optimization method herein is in terms of simulated annealing because it is well known and easily understood. However, this is for purposes of illustration only.

The perturbation process consists of randomly selecting a block (step 418) and tentatively perturbing its rock properties and nearby geologic interfaces (step 420). Preferably, model blocks intersected by wells are not candidates for selection; these observed values are to be left unchanged.

For the selected block, the preferred method for perturbation is to randomly pick rock-property values such that they are consistent with each other. For instance, a lithology may be selected according to the desired proportions of each lithology in the model, and then a value of porosity is randomly selected from the distribution of porosities corresponding to that lithology.

If the selected block is within a user-specified distance of a geologic interface, then the interface may be shifted tentatively to enclose the block in the adjacent zone or region. One embodiment of the present invention would randomly determine if the interface is to be shifted, i.e., the zone and/or region to which the block is tentatively assigned is randomly selected. A second embodiment calculates the effect of moving or not moving the interface, and selects the solution that best matches the desired criteria.

Some blocks may be within a user-specified distance of more than one geologic interface, resulting in more than two zones or regions to which the block could tentatively be assigned. The result of moving the geologic interface is that the zone or region is redefined locally and one or more blocks are now in another zone or region with potentially different objective-function criteria. In the preferred method, geologic-interface positions at nodes intersected by wells are not shifted; such interface positions are to be left as they are interpreted in the wells.

At step 422, tentative statistics to measure agreement of geological and geophysical criteria are calculated. As in step 412, component statistics for the geological and geophysical modeling criteria that determine if they adequately match the training information are calculated, but this time using the values of the tentative rock properties. In general, the preferred basis for selecting component statistics is that they can be updated locally without need to recompute them over the entire model.

If a geologic interface is moved, the two zones or regions on either side of the interface will be redefined, affecting calculated statistics. Hence, if an interface is to be moved, the effect of its movement should be accounted for by the appropriate geological and geophysical components.

At step 424, tentative statistics to measure agreement of geologic-interface criteria are calculated. As in step 414, component statistics that measure if the spatial attributes of the tentative geologic interfaces adequately match the training information are calculated. Geologic interfaces define zones and regions, presumably each with distinct criteria (e.g., histograms, variograms, and averages) for the rock properties within them.

Next, at step 426, a tentative objective function is calculated. The tentative component statistics for the geological, geophysical, and geologic-interface components are combined into a tentative objective function, $OBJtent = \Sigma W_i COMTi$, where again the sum is over all components, and the COMTi represent the tentative values of the components associated with this perturbation. OBJtent measures the degree of fit between rock properties and geologic interfaces in the tentative model and the desired rock properties and geologic interfaces.

The perturbation is retained or rejected at step 428. The decision as to whether the tentative rock-property values in the model block and the tentative positions of geologic interfaces are to be retained depends on the value of the newly calculated objective function. If the tentative objective function, OBJtent, is nearer the optimum than the current objective function, OBJ, i.e., OBJtent<OBJ, then the tentative perturbation is retained. In this case, the process proceeds to step 430 where the tentative rock-property values and tentative positions of geologic interfaces are stored in the model, and the objective function and components are changed to equal the tentative values. On the other hand, if the objective function has increased, the perturbation is rejected and the process returns to step 418. In this case, the tentative rock-property values, tentative positions of geologic interfaces, and objective-function components will be left unchanged. However, as noted above, simulated annealing allows retaining the perturbation with a small probability regardless of the objective function's increase. This is designed to prevent convergence from being trapped in a local minimum in the objective-function space. Other optimizing methods may not allow increases in the objective function.

Certain statistics may be based on stratigraphic correlations (e.g., variograms). Such correlations typically are defined by the surfaces used in modeling. If a tentative shift of a surface node is retained, then the surface is modified, thereby locally affecting the correlations, and possibly causing one or more of the test criteria to be inappropriate. For instance, porosity may increase from east to west; if an interface moves substantially to the east, the initial porosity histograms may no longer be appropriate for the regions. The preferred mode of operation is to recalculate or redefine the criteria to be attained by the geological and geophysical components according to the shifted zones or regions, although this may increase the time required to generate a model.

In addition, if surfaces are modified, intersections of surfaces (truncation or baselap) may occur, or previously intersecting surfaces may no longer intersect, or intersections may move slightly. The preferred mode is to introduce these changed stratigraphic relationships in the same way as when the surfaces were first introduced into the model.

The process next proceeds to a determination of whether the model is adequate or complete (step 432). If so, then the final model is output to file (step 434) and the process ends.

If the updated model is not adequate, the process returns to step 418 and continues the perturbation. The process is terminated when a pre-assigned number of perturbations have been attempted or when pre-assigned criteria on the objective function (e.g., minimum acceptable value) have been attained. Upon completion of the process, the optimized model of one or more rock properties is available for analysis, validation, and for geological, geophysical, or engineering applications. In addition, modified geologic interfaces are available.

Figure 5A:
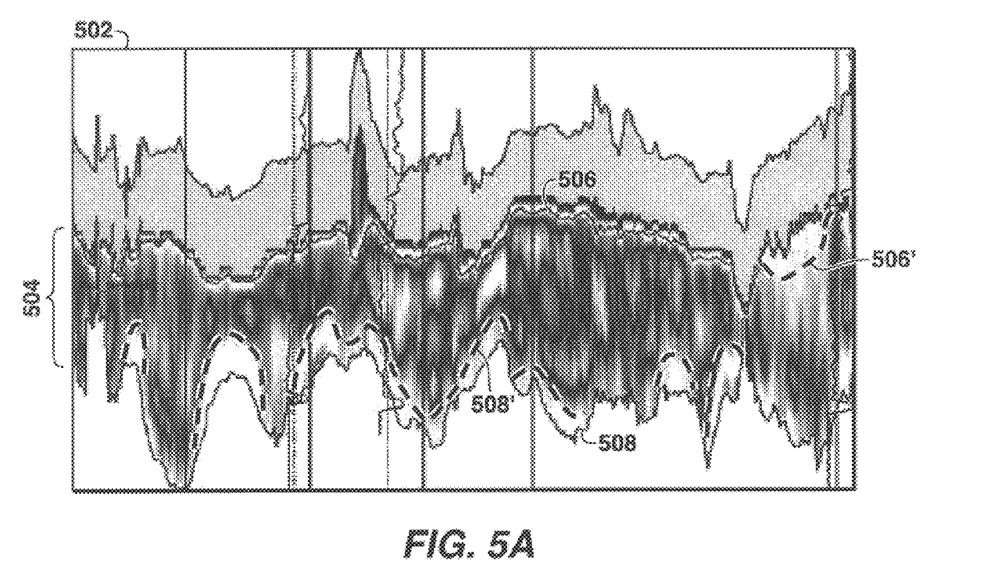
FIG. 5 illustrates application of the present invention to a porosity model for an eolian reservoir.
Figure 5B:
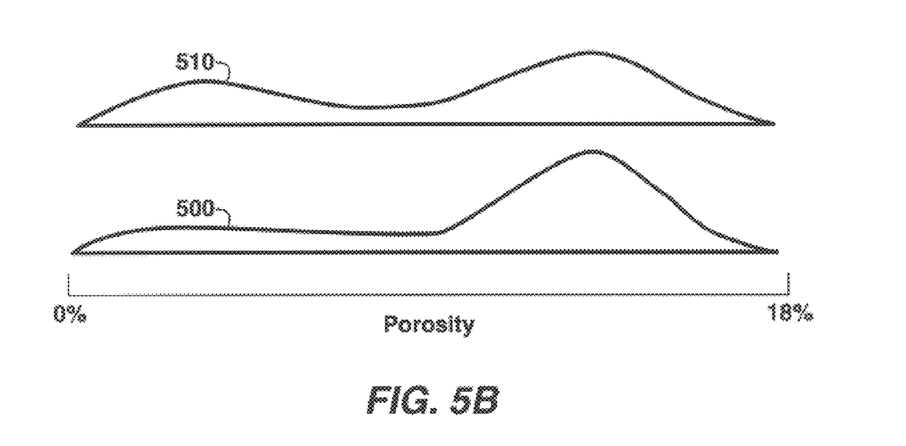

FIG. 5 illustrates a simple hypothetical example that shows the potential benefits of modifying surfaces in a tentative geologic model, so as to be consistent with a target assumption for the modeled rock property, in this case the target histogram of porosity 500. FIG. 5 shows a cross-section 502 from a porosity model for an eolian reservoir. The reservoir interval 504 is constrained by two interpreted surfaces (the top 506 and base 508 of the reservoir). An optimization algorithm was used to ensure that the resulting model was consistent with the seismic data, but, in this simple example, no other geological or geophysical criteria were honored. The surfaces 506, 508 used in building this tentative model were fixed and not allowed to move.

Once built, a histogram of porosity 510 was calculated for this model and compared to the target histogram 500. The two histograms are inconsistent, which suggests that, although consistent with the seismic data, the geologic model inaccurately represents the reservoir. Use of an inaccurate model could be very costly, potentially resulting in inaccurate estimates of hydrocarbon reserves, missed hydrocarbon-reservoir targets, and inappropriate reservoir-development strategies.

If the present invention had been applied in the modeling of this reservoir interval, the surfaces 506, 508 would have been modified as indicated by dashed lines 506' and 508', and the resulting model would have been consistent with both the seismic data and the target histograms of porosity.

The foregoing description has been directed to particular embodiments of the invention for the purpose of illustrating the invention. It will be apparent to persons skilled in the art, however, that many alternatives, modifications, and variations to the embodiments described herein are possible. All such alternatives, modifications, and variations are intended to be within the scope of the present invention, as defined by the appended claims.

We claim:

1. A process for constructing a three-dimensional geologic model of a subsurface earth volume containing one or more geologic interfaces, said process comprising the steps of:

(a) generating a tentative geologic model of said subsurface earth volume, said tentative geologic model comprising a three-dimensional array of contiguous model blocks, each model block having tentative values for one or more rock properties assigned thereto, said tentative geologic model containing tentative positions for said one or more geologic interfaces;

(b) specifying training criteria which define the spatial attributes of geologic interfaces and the characteristics of rock properties in said subsurface earth volume;

(c) calculating statistics that describe the spatial attributes of said tentative geologic-interface positions and the characteristics of said tentative rock-property values in said tentative geologic model; and (d) comparing statistics calculated in step (c) with corresponding training criteria specified in step (b) and either (1) if said statistics do not match said training criteria within specified limits, perturbing the tentative position within said tentative geologic model of at least a portion of at least one of said geologic interfaces, updating said tentative geologic model, and repeating steps (c) and (d), or (2) if said statistics match said training criteria within said specified limits, accepting said tentative geologic model as the three-dimensional geologic model for said subsurface earth volume.

2. The process of claim 1, wherein each geologic interface in said subsurface earth volume is represented in said tentative geologic model by a set of interface nodes, and wherein said perturbation in step (d)(1) comprises changing the position of only one of said interface nodes.

3. The process of claim 1, wherein each geologic interface in said subsurface earth volume is represented in said tentative geologic model by a set of interface nodes, and wherein said perturbation in step (d)(1) comprises changing the positions of all interface nodes within a specified distance from a specific interface node.

4. The process of claim 1, wherein step (d)(1) further includes perturbing the tentative value of at least one rock property for at least one of said model blocks prior to updating said tentative geologic model.

5. The process of claim 4, said process further comprising the step of moving the tentative positions within said tentative geologic model of said geologic interfaces as required to be consistent with said at least one peturbed rock-property value.

6. The process of claim 1, wherein said training criteria include the match between synthetic seismic traces derived from said tentative geologic model and actual seismic data traces for said subsurface earth volume.

7. The process of claim 1, wherein one or more wells are located in said subsurface earth volume, and wherein actual geologic-interface locations obtained from said wells are inserted into said tentative geologic model at fixed positions corresponding to their locations in said wells, said fixed geologic-interface positions being accepted as correct and not subject to perturbation.

8. The process of claim 4, wherein one or more wells are located in said subsurface earth volume, and wherein actual rock-property values obtained from said one or more wells are assigned to model blocks representing corresponding portions of said subsurface earth volume, said actual rock-property values being accepted as correct and not subject to perturbation.

9. The process of claim 1, wherein the vertical dimension of said tentative geologic model is seismic time.

10. The process of claim 1, wherein the vertical dimension of said tentative geologic model is vertical depth.

11. The process of claim 1, wherein separate training criteria are specified for each zone and each region in said subsurface earth volume.

12. The process of claim 1, wherein said array of contiguous model blocks is replaced by an array of discrete model points, and wherein said tentative rock-property values are assigned to said model points.

13. The process of claim 12, wherein at least a portion of said discrete model points correspond to sample points in a three-dimensional seismic data volume for said subsurface earth volume.

14. The process of claim 1, wherein said process is performed using a suitably programmed digital computer.

15. A process for constructing a three-dimensional geologic model of a subsurface earth volume containing one or more geologic interfaces, said process comprising the steps of:

(a) generating a tentative geologic model of said subsurface earth volume by
  (1) specifying initial positions within said tentative geologic model for said one or more geologic interfaces,
  (2) defining a three-dimensional array of contiguous model blocks to represent said subsurface earth volume, and
  (3) assigning initial rock-property values to each of said model blocks;
(b) specifying training criteria that define the characteristics of rock properties in said subsurface earth volume and the spatial attributes of geologic interfaces in said subsurface earth volume, and specifying desired values for said training criteria;
(c) calculating statistics comparing the characteristics of rock properties in said tentative geologic model and the spatial attributes of geologic interfaces in said tentative geologic model to the desired values for corresponding training criteria;
(d) combining the statistics calculated in step (c) into an objective function and calculating an initial value for said objective function;
(e) randomly selecting at least one model block and tentatively perturbing the value of at least one rock property thereof;
(f) if said selected model block is within a preselected distance from a geologic interface, determining whether or not to tentatively shift the position of said geologic interface to the opposite side of said selected model block;
(g) calculating tentative statistics and a tentative value for said objective function based on said rock-property perturbation and said geologic-interface position shift, if any;
(h) determining whether to accept or reject said rock-property perturbation and said geologic-interface position shift, if any, based on a preselected optimization procedure;
(i) if either or both of said rock-property perturbation and said geologic-interface position shift are accepted, updating said tentative geologic model and said objective-function value; and
(j) repeating steps (e) through (i) until a preselected number of perturbations have been attempted or predetermined criteria for said objective function have been attained.

16. The process of claim 15, wherein the determination in step (f) of whether or not to tentatively shift the position of said geologic interface to the opposite side of said selected model block is made randomly.

17. The process of claim 15, wherein the determination in step (f) of whether or not to tentatively shift the position of said geologic interface to the opposite side of said selected model block is made by calculating statistics to measure the effects of moving and of not moving the position of said geologic interface and selecting the option that best matches the desired values of the training criteria.

18. The process of claim 15, wherein said training criteria include the match between synthetic seismic traces derived from said tentative geologic model and actual seismic data traces for said subsurface earth volume.

19. The process of claim 15, wherein one or more wells are located in said subsurface earth volume, and wherein actual rock-property values and actual geologic-interface positions obtained from said wells are inserted into said tentative geologic model at corresponding model positions, said actual rock-property values and said actual geologic-interface positions being accepted as correct and not subject to perturbation.

20. The process of claim 19, wherein initial rock-property values for all model blocks that do not correspond to wells are determined at random.

21. The process of claim 15, wherein said preselected optimization procedure is simulated annealing.

22. The process of claim 15, wherein said preselected optimization procedure is the maximum a posteriori optimization procedure.

* * * * *